(12) United States Patent
Tanimura et al.

(10) Patent No.: US 6,479,579 B1
(45) Date of Patent: Nov. 12, 2002

(54) ANTI-BLOCKING AGENT MASTER BATCH

(75) Inventors: Hiroyuki Tanimura, Sodegaura; Takeshi Ebara, Ichihara, both of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/689,648

(22) Filed: Oct. 13, 2000

(30) Foreign Application Priority Data

Oct. 15, 1999 (JP) .............................. 11-293993

(51) Int. Cl.⁷ .................................. C08K 3/00
(52) U.S. Cl. ........................ 524/523; 524/528
(58) Field of Search ................. 524/523, 528

(56) References Cited

U.S. PATENT DOCUMENTS 4,786,678 A  11/1988  Dobreski et al.
5,609,679 A   3/1997  Lüers et al.

FOREIGN PATENT DOCUMENTS

| EP | A10718362 | 6/1996 |
| EP | B10659823 | 10/1997 |
| JP | A5764522  | 4/1982 |
| JP | 57064522  | 4/1982 |
| JP | 58101134  | 6/1983 |
| JP | 03027109  | 2/1991 |
| JP | A5214120  | 8/1993 |
| JP | A6107868  | 4/1994 |
| JP | 11106520 A | 4/1999 |

*Primary Examiner*—Edward J. Cain
(74) *Attorney, Agent, or Firm*—Birch, Stewart, Kolasch & Birch, LLP

(57) ABSTRACT

A process for producing an anti-blocking agent master batch, which comprises melt-kneading 100 parts by weight of a polyolefin-based resin and 2 to 100 parts by weight of polymer fine particles containing 0.10 to 20% by weight of a volatile component as an anti-blocking agent.

16 Claims, No Drawings

ANTI-BLOCKING AGENT MASTER BATCH

BACKGROUND OF THE INVENTION

1. Field of The Invention

The present invention relates to a process for producing an anti-blocking agent master batch, and more particularly, to a process for producing an anti-blocking agent master batch of a polyolefin-based resin providing film which has a good dispersion of polymer fine particles as an anti-blocking agent to a polyolefin-based resin, and is excellent in appearances such as transparency, see-through feeling, little generation of white spots (called as fish-eye) and the like, and in anti-blocking property.

2. Description of the Related Arts

A polyolefin-based resin film is used for materials for food packaging and textile packaging, and the like, because it is superior in physical properties such as transparency, mechanical property and the like.

However, the polyolefin-based resin in which an anti-blocking agent was added, has been used because the film made of the polyolefin-based resin not containing the anti-blocking agent has an insufficient anti-blocking property, piled films are mutually adhered, and the operability at packaging is lowered.

A polyolefin-based resin composition using polymer fine particles as an anti-blocking agent is reported. For example, polymer fine particles having a particle diameter of 3 to 40 µm and no melting point in JP-A-57-64522, inert organic polymer crosslinked particles having a weight average particle diameter of 0.5 to 7 µm in JP-A-05-214120, and a polyolefin-based resin composition using particles of a crosslinked polymer, as an anti-blocking agent, obtained by copolymerizing an acrylic monomer and a styrene monomer as main components which has a average particle diameter of 0.4 to 7 µm and a film made of the composition in JP-A-06-107868, are reported.

Further, a method of using a raw material resin obtained by previously adding the requisite quantity of an anti-blocking agent to a polyolefin-based resin is usually used as a production process of a film.

However, this process requires a preparation of many raw material resins, in accordance with the kinds of films. Further, as the concentration of the anti-blocking agent is low, the raw material resin becomes a large volume, and the production efficiency of the film is lowered.

Therefore, in order to improve the production efficiency, there has been recently used a process which comprises preliminarily preparing a raw material resin having a high concentration of an anti-blocking agent, namely a master batch, and properly adjusting the concentration of the anti-blocking agent by diluting the master batch with a polyolefin-based resin thereby to produce a film.

However, although the dispersability of the polymer fine particles as the anti-blocking agent in the polyolefin-based resin was fairly improved compared to that of an inorganic anti-blocking agent such as silica fine particles, the that of the polymer fine particles as the anti-blocking agent in the polyolefin-based resin is not necessarily sufficient, and the master batch contained coagulated matters of the polymer fine particles as the anti-blocking agent in the polyolefin-based resin. When a film is produced by diluting the master batch with the polyolefin-based resin and forming into the film from the diluted resin, there were problems that the coagulated matters are not dispersed, white spots caused by the coagulated matters are generated, the appearance of the film is deteriorated, and points not inked to the film are generated at printing, etc. The above-described problems have been appeared in accordance with heightening of levels required in film properties.

SUMMARY OF THE INVENTION

Under these circumstances, the present inventors have intensively studied and as a result, found that the above-mentioned problems can be solved by using an anti-blocking agent master batch prepared by melt-kneading a polyolefin-based resin with polymer fine particles, as an anti-blocking agent, containing a specific quantity of a volatile component thereby to complete the present invention.

An object of the present invention is to provide an anti-blocking agent master batch being able to provide a polyolefin-based resin film which has a good dispersion of polymer fine particles as an anti-blocking agent in a polyolefin-based resin, and is good in appearances such as transparency, see-through feeling, little generation of white spot (occasionally called as fish eye) and the like, and in anti-blocking property and the like, and a polyolefin-based resin film made of the master batch.

Namely, the present invention relates to a process for producing an anti-blocking agent master batch, which comprises melt-kneading 100 parts by weight of a polyolefin-based resin (A) and 2 to 100 parts by weight of a polymer fine particles(B) containing 0.10 to 20% by weight of a volatile component as an anti-blocking agent and further, to a film made of the above-mentioned anti-blocking agent master batch.

DETAILED DESCRIPTION OF THE INVENTION

The present invention is illustrated in detail below.

The polyolefin-based resin (A) used in the present invention is a homopolymer or copolymer of one or more of olefins.

The olefin includes ethylene and α-olefins having 3 to 12 carbon atoms such as propylene, 1-butene, 1-hexene, 4-methyl-1-pentene, 1-octene and the like.

As the polyolefin-based resin (A), a propylene-based resin is preferable. The propylene-based resin includes a propylene homopolymer and copolymers of propylene with ethylene and/or an α-olef in other than propylene such as a propylene-ethylene copolymer, a propylene-1-butene copolymer, a propylene-ethylene-1-butene copolymer, and the like.

The propylene-based resin preferably includes a crystalline propylene homopolymer and/or a crystalline propylene copolymer.

The crystallinity can be determined by the amount of the 20° C. xylene-soluble portion (hereinafter, referred to as "CXS") in the crystalline propylene homopolymer or the crystalline propylene copolymer. When the amount of the CXS is large, the homopolymer or copolymer contains a large amount of an amorphous portion and shows a low crystallinity. On the other hand, when the amount of the CXS is small, the homopolymer or copolymer contains a small amount of an amorphous portion and shows a high crystallinity. The content of the CXS is preferably 30% by weight or less, more preferably 20% by weight or less, and most preferably 15% by weight or less.

The more preferable propylene-based resin is a crystalline propylene homopolymer or crystalline propylene copolymer having a total content of units derived from at least one monomer selected from ethylene, 1-butene, 1-hexene, 4-methyl-1-pentene and 1-octene of 2% by weight or less.

The melt flow rate (hereinafter, referred to as "MFR") measured at 230° C. under a load of 2.16 kg/cm² according to JIS K7210 of the polyolefin-based resin used in the present invention is preferably 0.1 to 20g/10 min. from the view point of processability and film properties, and more preferably 0.5 to 10 g/10 min.

Further, in the polyolefin-based resin used in the present invention, other polymers such as a styrene-based resin, an ethylene-propylene copolymer rubber, an ethylene-propylene-diene copolymer rubber and the like, may be optionally added within a range in which the object and effect of the present invention are not damaged.

Polymers constituting polymer fine particles(B) as an anti-blocking agent used in the present invention are not specifically limited, and there are illustrated polymers obtained by polymerizing at least one monomer selected from the group consisting of aromatic mono-vinyl compounds (e.g. styrene, α-methylstyrene), acrylic acid ester compounds(e.g. methyl acrylate, 2-ethylhexyl acrylate), methacrylic acid ester compounds(e.g. methyl methacrylate, 2-ethylhexyl methacrylate), mono-, di-carboxylic acid or di-carboxylic acid anhydrides(e.g. acrylic acid, methacrylic acid, maleic acid, maleic anhydride), vinyl cyanide compounds (e.g. acrylonitrile, methacrylonitrile), acrylic amide compounds(e.g. acrylamide, methacrylamide, N-methylol acrylamide, N-methylol methacrylamide), ionic monomers (e.g. sodium acrylate, sodium methacrylate, sodium styrene sulfonate) and the like. Among these, styrene, methyl acrylate, methyl methacrylate, 2-ethylhexyl acrylate and 2-ethylhexyl methacrylate are preferable.

As the polymerization process, there are can be used known processes, for example, a suspension polymerization, a micro suspension polymerization, a dispersion polymerization, an emulsion polymerization, a soap-free polymerization process, a seed polymerization process and the like. Particularly, an emulsion polymerization, a dispersion polymerization, a soap-free polymerization and a seed polymerization are preferable from the viewpoint of film property.

The polymer fine particles used in the present invention may be fine particles of a crosslinked polymer obtained by polymerizing using at least one crosslinking agent in combination at polymerization of the above-mentioned monomer. The crosslinking agent includes compounds having two or more of polymerizable double bonds in its molecule. Specific examples of the crosslinking agent include divinylbenzene, trimethylolpropane triacrylate, trimethylolpropane trimethacrylate, glycidyl acrylate, glycidyl methacrylate, allyl acrylate, allyl methacrylate, and the like. The crosslinked polymer fine particles are preferable because the shape is maintained to a certain degree in the respective steps-of melt-kneading, sheet forming, and stretching in the film molding of the polyolefin-based resin.

The polymer fine particles used as an anti-blocking agent in the present invention, have a weight average particle diameter of 0.5 to 15 αm, preferably 0.8 to 10 µm, and more preferably 1.0 to 8.0 µm.

The volatile component contained in the polymer fine particles used in the present invention is not specifically limited, and for example, those usually used as a liquid medium can be mentioned. Specifically, alcohols, saturated hydrocarbons, aromatic hydrocarbons, ketones, aldehydes, organic acid esters, and ethers, or a mixture thereof can be mentioned. The alcohols include methanol, ethanol, propanol, pentanol, hexanol, octanol, benzyl alcohol, ethylene glycol and the like. The saturated hydrocarbons include pentane, hexane, heptane, octane and the like. The aromatic hydrocarbons include benzene, toluene, xylene and the like. The ketones include acetone, methyl ethyl ketone, methyl isobutyl ketone and the like. The aldehydes include acetaldehyde, propionaldehyde, benzaldehyde and the like. The organic acid esters include methyl acetate, ethyl acetate, octyl acetate, methyl butyrate, methyl methacrylate, methyl benzoate, ethyl benzoate and the like. The ethers include isopropyl ether, butyl ether, amyl ether, tetrahydrofuran, anisole and the like. Water, methanol, ethanol, propanol, hexane, heptane, toluene and xylene are preferable, and water is preferable in particular.

The amount of the volatile component contained in the polymer fine particles used in the present invention is 0.10 to 20 by weight, preferably 0.10 to 15% by weight, and more preferably 0.10 to 10% by weight.

Herein, the amount of the volatile component contained in the polymer fine particles is defined by the following equation.

$$(a)(\% \text{ by weight}) = \{((b)-(c))/(b)\} \times 100$$

wherein (a) shows content of the volatile component, (b) shows weight of polymer fine particles before drying, and (c) shows weight of polymer fine particles after drying.

When the volatile component content is less than 0.10% by weight, the dispersion into the polyolefin-based resin of the polymer fine particles often becomes insufficient.

On the other hand, when the content exceeds 20% by weight, the melt-extrusion happens to be impossible because feeding into a screw of an extruder of the mixture becomes difficult when the mixture of the polymer fine particles and the polyolefin-based resin is melt extruded, or the resin extruded foams.

The method of adjusting the concentration of the volatile component contained in the polymer fine particles used in the present invention is not specifically limited, and for example, methods described below are mentioned.

① A method of leaving a liquid medium and/or washing liquid used in production of the polymer fine particles, in the polymer fine particles at a fixed concentration as the volatile component.

② A method of leaving a liquid medium and/or washing liquid used in production of the polymer fine particles, in the polymer fine particles at a high concentration as the volatile component, and removing the volatile component to adjust it to a fixed concentration. As a method of removing the volatile component, methods of drying the polymer fine particles using a spray dryer, a Nauter dryer, an oven dryer and the like are exemplified.

③ A method of leaving a liquid medium and/or washing liquid used in production of the polymer fine particles, in the polymer fine particles at a high concentration as the volatile component and removing the volatile component while mixing them with a polyolefin-based resin powder to adjust it to a fixed concentration. As a method of mixing with the powder and removing the volatile component, methods of using a Henschel mixer, a tumbler mixer, a Nauter dryer and the like are exemplified.

④ A method of perfectly removing a liquid medium and/or washing liquid used in the production of the polymer fine particles, and then newly adding a volatile component to the polymer fine particles to adjust it to a fixed concentration. As a method of removing the liquid medium and/or washing liquid, known methods such as filtration, drying and the like are illustrated.

In the production of the anti-blocking agent master batch, the amount used of the polymer fine particles (component B) containing 0.10 to 20% by weight of the volatile component is 2 to 100 parts by weight per 100 parts by weight of the polyolefin-based resin (component A), preferably 2 to 80 parts by weight, and more preferably 2 to 50 parts by weight.

When the amount of the polymer fine particles containing 0.10 to 20% by weight of the volatile component is less than 2 parts by weight, the production efficiency as a master batch happens to be insufficient, and when it exceeds 100 parts by weight, the dispersion of the polymer fine particles in the polyolefin-based resin happens to be insufficient.

The compounding method in the production of the anti-blocking agent master batch is not limited so far as homogeneous mixing of the polyolefin-based resin with the polymer fine particles containing 0.10 to 20% by weight of the volatile component is accomplished, and examples of the mixing method include methods of mixing using a ribbon blender, a Henschel mixer, a tumbler mixer and the like. Further, the polyolefin-based resin and the polymer fine particles may be directly melt-kneaded without the mixing described above.

In the anti-blocking agent master batch, known additives such as, for example, an antioxidant, a neutralizer, a lubricant, an anti-dripping agent, an antistatic agent, a nucleating agent and the like may be used in combination, so far the object and effect of the present invention are not damaged. The compounding of these additives can be appropriately carried out when the respective components of the anti-blocking agent master batch are mixed or melt-kneaded.

The anti-blocking agent master batch is obtained by melt-kneading the polyolefin-based resin(A) and the polymer fine particles (B) containing 0.10 to 20% by weight of the volatile component using a known means, for example, an extruder, kneader or the like, after or without the mixing operation. Usually after the melt-kneading, the kneaded mixture is pelletized using a known method. The kneading temperature in an extruder is usually 180 to 280° C., and preferably 200 to 250° C.

In the anti-blocking agent master batch obtained, polymer fine particles as the antiblocking agent are homogeneously dispersed without coagulating in the polyolefin-based resin. The volatile component in the polymer fine particles in the anti-blocking agent master batch is little contained because the volatile component is volatized during the melt-kneading.

The anti-blocking agent master batch of the present invention is suitably used for production of a film. As the production process of a film, a process which contains diluting the anti-blocking agent master batch with a polyolefin-based resin and forming the resulted resin composition containing the polymer fine particles as the anti-blocking agent into a film is used.

The forming process of a film after the dilution is not specifically limited, and a known method is used.

For example, there are used melt-extrusion film forming processes such as a T-die film forming process, a tubular film forming process in which a resin composition obtained by diluting the anti-blocking agent master batch with the polyolefin-based resin is extruded from a T-die and a circular die, respectively, and the like. A tenter filming process of melt-kneading a resin composition obtained by diluting the anti-blocking agent master batch with the polyolefin-based resin, extruding it in sheet-like, cooling the extruded sheet, for example, with a cooling roll, and then stretching to at least uni-axial direction(uni- or bi-axial direction) while heating to make a film is preferable.

The concentration of the polymer fine particles as the anti-blocking agent which is contained in the diluted resin is 0.01 to 2% by weight, preferably 0.03 to 1% by weight, and preferably 0.05 to 0.8% by weight in particular.

When the content of the polymer fine particles is less than 0.01% by weight, the anti-blocking property of the film obtained from the diluted resin is often insufficient, and when it exceeds 2% by weight, the transparency of the film obtained may become inferior.

The thickness of the film is not specifically limited, and usually 1 to 200 $\mu$m, preferably 5 to 100 $\mu$m, and further preferably 8 to 50 $\mu$m.

The present invention is further illustrated in detail below according to Examples and Comparative Examples, but the present invention is not specifically limited by Examples below. Further, the detailed descriptions of the present invention and the measured values of the respective items in Examples were measured according to the methods described below.

1. Measurement of the Amount of a Volatile Component Contained in a Polymer Fine Particles (Unit: % by Weight)

Using LACOM DRY OVEN manufactured by IUCHI Co., Ltd., 70 g of a sample was dried, at 110° C. for 1 hour, left alone to be cooled to room temperature in a desiccator after drying, and the samples before drying and after drying were weighted using an electric balance which can measure to an order of 0.1 g to determine the amount according to the equation below:

Amount of volatile component (% by weight)={(weight before drying–weight after drying)/weight before drying}×100 .

Further, the polyolefin-based resin used in Examples below is a propylene polymer powder having an MFR of 2.3 g/10 min and a CXS of 3.0% by weight, and the amount of the volatile component contained in the propylene polymer powder was 0% by weight.

2. Film Properties (1) Haze (unit: %)

It was measured according to ASTM D-1003.

(2) Light Scattering Index (LSI) (unit: %)

It was measured by a LSI tester (±0.4° to 1.2° of transmitted light scatter is received) manufactured by TOYO-SEIKI Co., Ltd. LSI value was made as a measure of see-through feeling.

(3) Anti-blocking property (unit MPa or kg/12 cm$^2$):

Using films of 120 mm×30 mm, the films are mutually piled up, and condition adjustment was carried out at 60° C. for 3 hours under a load of 500 g/40 mm×30 mm.

Then, the laminate was left alone for 30 minutes or more under an atmosphere at 23° C. and a humidity of 50% for condition adjustment. Then, tensile test was carried out at a speed of 200 mm/min. using a shear tensile tester, and the strength required for peeling a film was measured. Measurement was carried out 4 times per one sample, and the mean value was calculated to make the value of anti-blocking property of the film.

(4) Numbers of white spot: (unit: pieces/25 cm$^2$)

The numbers of white spots having a size of about 0.2 mm to 1 m which are in an arbitrary region of 5 cm×5 cm of a film were determined by visual inspection. The operation was repeated twice to determine the mean value.

EXAMPLE 1
(a) Production of Polymer Fine Particle

Into a pressure glass vessel equipped with a stirrer and a reflux cooler, 380 parts by weight of methanol, 20 parts by weight of deionized water, 34 parts by weight of styrene, 60 parts by weight of 2-ethylhexyl acrylate, 11 parts by weight of divinylbenzene, 2.5 parts by weight of hydroxypropyl cellulose and 2 parts by weight of tert-butylperoxy-2-ethylhexanoate were charged, the mixture was homogeneously dissolved, then the vessel was closed, and the mixture was polymerized at 900° C. for 10 hours. Then, after a mixed solution of 200 parts by weight of methanol, 48 parts by weight of styrene, 4 parts by weight of 55% divinylbenzene and 1 part by weight of 2,2'-azobis(2,4-dimethylvaleronitrile) was added thereto at 60° C. over 20 minutes, the mixture was further subjected to polymerization at 60° for 4 hours, and an organic solvent slurry of polymer fine particles was obtained. When the particle diameter of the fine particles collected by partially sampling from the organic solvent slurry was measured, the average particle diameter was 1.2 $\mu$m.

Successively, pressured steam was blown in the slurry, the mixture of methanol and water evaporated was recovered with a condenser. When the temperature of polymerization solution reached at 99° C., the blow of steam was completed to obtain an aqueous slurry of polymer fine particles. Further, the aqueous slurry obtained was separated by filtration under vacuum using a No.1 qualitative filter paper to obtain a polymer fine particle wet cake containing a volatile component of 48% by weight.

(b) Adjustment of Amount of Volatile Component Contained in Polymer Fine Particles For 150 parts by weight of a propylene polymer powder having a melt index of 2.3 g/10 min., 181 parts by weight of the polymer fine particles having a volatile component amount of 48% by weight which was obtained in the fore-mentioned (a) was charged in a Nauter dryer, a jacket temperature was adjusted to 105° C. by steam, the pressure of inside was reduced to 400 Pa (about 30 Torrs), and drying was started while homogeneously stirring. When the temperature of the sample of inside reached at 40° C., the drying was stopped. The amount of the volatile component contained in the polymer fine particles obtained was 0.38% by weight.

(c) Preparation of Master Batch 100 parts by weight of the fore-mentioned propylene polymer powder as the polyolefin-based resin (component A), 25 parts by weight of the polymer fine particles containing 0.38% by weight of the volatile component as the component B, 0.1 part by weight of calcium stearate as a neutralizing agent, and 0.2 part by weight of BHT (2,6-di-tert-butyl-4-methylphenol) and 0.2 part by weight of Irganox 1010 (manufactured by CIBA Specialty Chemicals Co., Ltd.) as an antioxidant were mixed with a Henschel mixer, and then the mixture was melt-kneaded and then pelletized at 220° C. with an extruder to obtain an anti-blocking agent master batch having 20% by weight of the polymer fine particles. The compounding amounts of the polyolefin-based resin (component A) and the polymer fine particles (component B) in the master batch were shown in Table 1.

(d) Preparation of Stretched Film

To 99 parts by weight of a polypropylene pellet (trade mark Sumitomo Noblene, grade; FS2011D), 1 part by weight of the anti-blocking agent master batch pellet prepared in the above-mentioned (c) was added, mixed with a pellet blender, and then the mixture was melt-extruded at a resin temperature of 260° C. and rapidly quenched by a cooling roll at 60° C. to obtain a sheet having a thickness of 0.8 mm. After preliminary heating, the sheet was stretched 5-fold to a vertical direction at a stretching temperature of 145° C. by a roll peripheral speed difference of a vertical stretching machine, and further stretched 8-fold to a horizontal direction at a stretching temperature of 157° C. by a tenter stretching machine, and successively heat-treated at 165° C. to obtain a film having a thickness of 20 $\mu$m, and then a corona treatment of one side surface of the film was carried out. The physical properties of the film were shown in Table 2

EXAMPLE 2
(a) Synthesis of Polymer Fine Particle

The polymer fine particles were synthesized in the same manner as in Example 1. Successively, pressured steam was blown in the same manner as in Example 1, and the mixture of methanol and water evaporated was recovered with a condenser. When the temperature of polymerization solution reached at 99° C., the blow of steam was completed to obtain an aqueous slurry of polymer fine particles. Further, the aqueous slurry obtained was separated by filtration under vacuum using a No.1 qualitative filter paper to obtain a polymer fine particle wet cake having a volatile component amount of 44% by weight.

(b) Adjustment of Amount of Volatile Component Contained in Polymer Fine Particle Drying was carried out in the same manner as in Example 1, except that for 200 parts by weight of a propylene polymer powder having a melt index of 2.3 g/10 min, 375 parts by weight of the polymer fine particles having a volatile component amount of 44% by weight which was obtained in the fore-mentioned (a) was charged in a Nauter dryer. The amount of the volatile component contained in the polymer fine particles obtained was 1.3% by weight.

(c) Preparation of Master Batch

Preparation was carried out in the same manner as in Example 1, except that for 100 parts by weight of the fore-mentioned propylene polymer powder of the polyolefin-based resin as the component A), 26 parts by weight of the polymer fine particles containing 1.3% by weight of the volatile component as the component B was used, to obtain an anti-blocking agent master batch having 20% by weight of the polymer fine particles. The compounding amounts of the polyolefin-based resin (component A) and the polymer fine particles (component B) in the master batch were shown in Table 1.

(d) Preparation of Stretched Film

A film was prepared in the same manner as in Example 1. The physical properties of the film were shown in Table 2.

EXAMPLE 3
(a) Synthesis of Polymer Fine Particle

The polymer fine particles were synthesized in the same manner as in Example 1. Successively, pressured steam was blown in the same manner as in Example 1, and the mixture of methanol and water evaporated was recovered with a condenser. When the temperature of polymerization solution reached at 99° C., the blow of steam was completed to obtain an aqueous slurry of polymer fine particles. Further, the aqueous slurry obtained was separated by filtration under vacuum using a No.1 qualitative filter paper to obtain a polymer fine particle wet cake having a volatile component amount of 44% by weight.

(b) Adjustment of Amount of Volatile Component Contained in Polymer Fine Particle Drying was carried out in the same manner as in Example 1, except that for 200 parts by weight of a propylene polymer powder having a melt index of 2.3 g/10 min, 346 parts by weight of the polymer fine particles having a volatile component amount of 44% by weight which was obtained in the fore-mentioned (a) was charged in a Nauter dryer. The amount of the volatile component contained in the polymer fine particles obtained was 5.1% by weight.

(c) Preparation of Master Batch

Preparation was carried out in the same manner as in Example 1, except that for 100 parts by weight of the fore-mentioned propylene polymer powder of the polyolefin-based. resin as the component A, 26 parts by weight of the polymer fine particles containing 5.1% by weight of the volatile component being the component B was used, to obtain an anti-blocking agent master batch having 20% by weight of the polymer fine particles. The compounding amounts of the polyolefin-based resin (component A) and the polymer fine particles (component B) in the master batch were shown in Table 1.

(d) Preparation of Stretched Film

A film was prepared in the same manner as in Example 1 The physical properties of the film were shown in Table 2.

Comparative Example 1

(a) Synthesis of Polymer Fine Particle

The polymer fine particles were synthesized in the same manner as in Example 1 Successively, pressured steam was blown in the same manner as in Example 1, and the mixture of methanol and water evaporated was recovered with a condenser. When the temperature of polymerization solution reached at 99° C., the blow of steam was completed to obtain an aqueous slurry of polymer fine particles. Further, the aqueous slurry obtained was separated by filtration under vacuum using a No.1 qualitative filter paper to obtain a polymer fine particle wet cake having a volatile component amount of 48% by weight.

(b) Adjustment of Amount of Volatile Component Contained in Polymer Fine Particle For 100 parts by weight of a propylene polymer powder having a melt index of 21.3 g/10 min, 194 parts by weight of the polymer fine particles having a volatile component amount of 48% by weight which was obtained in the fore-mentioned (a) was charged in a Nauter dryer, a jacket temperature was adjusted to 134° C. by steam, the pressure of inside was reduced to 667 Pa (about 5 Torr), and drying was carried out while homogeneously stirring. When the temperature of the sample of inside reached at 120° C., the drying was stopped. The amount of the volatile component contained in the polymer fine particles obtained was 0.05% by weight.

(c) Preparation of Master Batch

Preparation was carried out in the same manner as in Example 1, except that for 100 parts by weight of the fore-mentioned propylene polymer powder of the polyolefin-based resin as the component A, 25 parts by weight of the polymer fine particles containing 0.05% by weight of the volatile component as the component B was used, to obtain an anti-blocking agent master batch having 20% by weight of the polymer fine particles. The compounding amounts of the polyolefin-based resin (component A) and the polymer fine particles (component B) in the master batch were shown in Table 1.

(d) Preparation of Stretched Film

A film was prepared in the same manner as in Example 1. The physical properties of the film were shown in Table 2.

As understood from Tables 1 and 2, films of Examples 1 to 3 had little white spots andante excellent appearance. To the contrary, the film of Comparative Example 1 not satisfying the volatile component amount contained in the polymer fine particles which is an essential condition of the present invention, generated many white spots and had bad appearance. Further, Examples 1 to 3 also had no problem in transparency (Haze), see-through feeling (LSI) and anti-blocking property.

TABLE 1

Compounding amounts of the polyolefin-based resin (component A) and the polymer fine particle (component B) in master batch

| | Compounding amount of polyolefin-based resin (A) Parts by weight | Amount of volatile component contained in polymer fine particle % by weight | Compounding amount of polymer fine particle containing volatile component (B) Parts by weight |
|---|---|---|---|
| Example 1 | 100 | 0.38 | 25 |
| Example 2 | 100 | 1.3 | 26 |
| Example 3 | 100 | 5.1 | 26 |
| Comparative Example 1 | 100 | 0.05 | 25 |

TABLE 2

Physical properties of film

| | Amount of polymer fine particle added % of weight | Haze | LSI | Anti-blocking property MPa (kg/12 cm$^2$) | Numbers of white spot point (size: 0.2 to 1 mm) Pieces/25 cm$^2$ |
|---|---|---|---|---|---|
| Example 1 | 0.2 | 1.8 | 1.0 | 1.3 (1.1) | 3 |
| Example 2 | 0.2 | 1.8 | 1.0 | 1.3 (1.1) | 2 |
| Example 3 | 0.2 | 1.8 | 1.2 | 1.3 (1.1) | 3 |
| Comparative Example 1 | 0.2 | 1.9 | 1.7 | 0.94 (0.8) | 58 |

The anti-blocking agent master batch of the present invention has a good dispersion of a polymer fine particles as an anti-blocking- agent to a polyolefin-based resin, and a film made of the anti-blocking agent master batch can be suitably used in broad fields such as food packaging, textile packaging and the like, because of excellent physical properties of the film.

What is claimed is:

1. A process for producing an anti-blocking agent master batch, which comprises melt-kneading 100 parts by weight of a polyolefin-based resin and 2 to 100 parts by weight of polymer fine particles containing 0.38 to 20% by weight of a volatile component based on the weight of the polymer fine particles containing the volatile component, as an anti-blocking agent.

2. The process according to claim 1, wherein the polymer fine particles contain the volatile component of 0.38 to 15% by weight and have a weight average particle diameter of 0.5 to 15 μm.

3. An anti-blocking agent master batch obtained by the process of claim 1.

4. An anti-blocking agent master batch obtained by the process of claim 2.

5. A process for producing a polyolefin-based resin film, which comprises diluting the anti-blocking agent master batch of claim 3 with a polyolefin-based resin so that the concentration of the polymer fine particles as an anti-blocking agent is 0.38 to 2% by weight based on the resin, to obtain a resin composition for film, and forming the resin composition to a film.

6. A process for producing a polyolefin-based resin film, which comprises diluting the anti-blocking agent master batch of claim 4 with a polyolefin-based resin so that the concentration of the polymer fine particles as an anti-blocking. agent is 0.38 to 2% by weight based on the resin, to obtain a resin composition for film, and forming the resin composition to a film.

7. A film obtained by the process of claim 5.

8. A film obtained by the process of claim 6.

9. The process according to claim 1, wherein the volatile component is water.

10. The process according to claim 2, wherein the volatile component is water.

11. The process according to claim 5, wherein the volatile component is water.

12. The process according to claim 6, wherein the volatile component is water.

13. The anti-blocking agent master batch obtained by the process of claim 9.

14. The anti-blocking agent master batch obtained by the process of claim 10.

15. A film obtained by the process of claim 11.

16. A film obtained by the process of claim 12.

* * * * *